United States Patent [19]
Bronstert et al.

[11] 4,031,166
[45] June 21, 1977

[54] IMPACT-RESISTANT POLYSTYRENE, α-OLEFIN, BLOCK COPOLYMER BLENDS

[75] Inventors: Klaus Bronstert, Carlsberg; Gerhard Fahrbach, Schwetzingen; Eduard Krahé, Altrip; Volker Ladenberger, Schwetzingen, all of Germany; Ernst-Guenther Kastning, late of Assenheim, Germany, by Marie-Louise Hermine Kastning, heiress-at-law; Hans Mittnacht, Mannheim, Germany; Herbert Willersinn, Ludwigshafen, Germany; Hans-Georg Trieschmann, Hambach, Germany

[73] Assignee: Badische Anilin- & Soda-Fabrik Aktiengesellschaft, Ludwigshafen (Rhine), Germany

[22] Filed: Feb. 19, 1974

[21] Appl. No.: 443,750

Related U.S. Application Data

[63] Continuation of Ser. No. 108,169, Jan. 20, 1971, abandoned.

[30] Foreign Application Priority Data

Jan. 29, 1970  Germany .......................... 2003916

[52] U.S. Cl. ...................... 260/876 B; 260/878 R; 260/879; 260/889

[51] Int. Cl.$^2$ ................. C08L 53/02; C08L 23/04; C08L 23/10; C08L 9/06

[58] Field of Search .......... 260/876 R, 876 B, 889, 260/878 R; 204/159.2

[56] References Cited

UNITED STATES PATENTS

| | | | |
|---|---|---|---|
| 3,299,174 | 1/1967 | Kuhre et al. | 260/876 B |
| 3,445,543 | 5/1969 | Gruver | 260/876 B |
| 3,459,830 | 8/1969 | Legge et al. | 260/876 B |
| 3,595,942 | 7/1971 | Wald et al. | 260/880 B |
| 3,810,957 | 5/1974 | Lunk | 260/876 B |
| 3,862,068 | 1/1975 | Russell | 260/876 B |

*Primary Examiner*—Murray Tillman
*Assistant Examiner*—Thurman K. Page
*Attorney, Agent, or Firm*—Johnston, Keil, Thompson & Shurtleff

[57] ABSTRACT

Impact-resistant thermoplastic molding materials prepared from a rigid component and a soft component. The rigid component consists of polystyrene, the soft component consists of a mixture of a polyolefin with a copolymer of a vinylaromatic and a diene hydrocarbon which has been prepared by anionic solution polymerization and which may have been hydrogenated. The molding materials may be used for the production of molded parts for use in domestic appliances, automobiles and refrigerators.

8 Claims, No Drawings

IMPACT-RESISTANT POLYSTYRENE, α-OLEFIN, BLOCK COPOLYMER BLENDS

This is a continuation of application Ser. No. 108,169, filed Jan. 20, 1971, now abandoned.

The invention relates to impact-resistant thermoplastic molding materials consisting of polystyrene, a polyolefin and an uncrosslinked copolymer prepared by anionic solution polymerization from a vinylaromatic and a diene hydrocarbon, which molding materials may be crosslinked.

It is known that the mechanical properties of polystyrene can be considerably improved by modification with rubber. Such products have hitherto been prepared either by polymerization of a solution of rubber in styrene or by intimately mixing polystyrene and rubber. When the first method is used, a chemical union between the polystyrene phase and the rubber phase takes place (grafting). The products have good impact resistance and excellent elongation at break, but have a matt surface. When polystyrene is mixed mechanically with rubber, the union of the rubber particles with the polystyrene phase loses in importance. If therefore it is desired to obtain the same impact resistance as in the case of the graft polymer, considerably more rubber has to be incorporated. The products have an outstandingly smooth surface but their elongation at break is much lower than in the case of the graft polymers.

It is known from French Pat. No. 1,457,763 that blends of polystyrene with block copolymers of butadiene and styrene have a much better impact resistance than blends with conventional rubbers. The impact resistance of graft polymers having comparable amounts of rubber is however not achieved.

Attempts have also been made to prepare blends of polystyrene and polyethylene. Thus according to French Pat. No. 1,095,054 up to 5% of polyethylene is incorporated into polystyrene in order to obtain products having increased flexibility. Normally however polystyrene and polyethylene have very poor compatibility so that only very inhomogeneous products are formed.

Blends of a graft polymer (which has been obtained by polymerization of a solution of rubber in styrene) with polyethylene are described in French Pat. No. 1,402,525. Although such mixtures have high heat distortion strength and satisfactory impact resistance, their rigidity and elongation leave very much to be desired.

An object of the present invention is to provide highly impactresistant thermoplastic molding materials having a high gloss as well as satisfactory rigidity and elongation.

We have now found that impact-resistant thermoplastic molding material having the said properties is obtained from mixtures of (A) 70 to 99% by weight of a homopolymer of styrene or a copolymer of styrene with up to 60% by weight of a styrene bearing a substituent in the nucleus or in a side chain; and (B) 30 to 1% by weight of a soft component consisting of
1. and α-olefin polymer; and
2. a substantially gel-free and uncrosslinked copolymer, preparted by anionic solution polymerization from a vinylaromatic and a diene hydrocarbon, which may if desired be wholly or partly hydrogenated.

A preferred embodiment of the invention consists in wholly or partly crosslinking the mixture.

The component (A) consists preferably of polystyrene; copolymers of styrene with up to 60% by weight (based on the total amount of monomers) of a styrene bearing a substituent in the nucleus or in a side chain. Examples of suitable comonomers are α-methylstyrene, nuclear-methylated styrene, nuclear-chlorinated styrenes.

The soft component (B) consists of a mixture of an α-olefin polymer with a copolymer in the weight ratio of from 15:1 to 1:3, preferably in a ratio of from 10:1 to 1:1. It is contained in the whole mixture in an amount of from 1 to 30%, preferably from 3 to 20%, by weight. In principle more than 30% by weight of the soft component may be incorporated, but the molding material then becomes very soft and useless for many purposes.

The polyolefin (B1) is preferably polyethylene; not only high pressure polyethylene having a mean molecular weight of from 10,000 to 50,000 but also low pressure polyethylene having a mean molecular weight of from 40,000 to 1,000,000 may be used. Other poly-α-olefins, such as polypropylene or polyisobutylene, as well as copolymers of two or more α-olefins may however also be used.

The copolymer (B2) consists of a vinylaromatic and a diene hydrocarbon, preferably in the weight ratio of from 10:90 to 90:10. It should be in a substantially gel-free and uncrosslinked condition at the beginning of the incorporation step. Substantially gel-free and uncrosslinked means that not more than 10% by weight and preferably less than 1% by weight of the copolymer remains as an insoluble residue when 1 part by weight of the copolymer is dissolved in 100 parts by weight of toluene. The copolymers are prepared by anionic solution polymerization of a vinylaromatic monomer with a diene hydrocarbon. Styrene is preferably used as the vinylaromatic, but derivatives of styrene such as α-methylstyrene or nuclear-substituted styrenes may be used, if desired mixed with styrene. The preferred diene hydrocarbon is butadiene, but isoprene or dimethylbutadiene is equally suitable. Polymerization is carried out in organic solvents and is initiated by initiators having anionic action. The solvents may be hydrocarbons such as benzene or ethylbenzene and the initiators may be alkyl metals such as n-butyl lithium. Diene polymers prepared in this way have a substantially linear structure; they have a relatively narrow molecular weight distribution and are distinguished by a low content of 1,2-vinyl groups. It is preferred that less than 15% of the double bonds stemming from the diene hydrocarbon should have 1,2-vinyl configuration.

Examples of copolymers (B2) which are particularly suitable are:

1. block copolymers of the type X-Y and X-(Y-X)$_n$ where X denotes a vinylaromatic, Y denotes a diene hydrocarbon and $n$ denotes an integer, preferably 1. Such block copolymers may be prepared for example by the method described in U.S. Pat. No. 3,149,182. It is preferred first to polymerize styrene in solution in a hydrocarbon in the presence of an alkyl lithium and then to add the butadiene so that a polybutadiene chain forms on the polystyrene chain, which has already formed, at the living end of the chain. If desired, a further styrene block may be attached by adding more styrene. Polymerization is stopped by adding a chain stopper such as alcohol, water or oxygen. The molecular weights of the block copolymer may vary within wide limits but at very low molecular weights of less than 10,000 only inferior mechanical values are achieved for the blend whereas as very high molecular weights, for example of more than 1,000,000, incorporation becomes difficult. The block copolymer should preferably contain from 15 to 60% by weight of the vinylaromatic.

2. Copolymers of vinylaromatics with diene hydrocarbons in statistical distribution. Under specific conditions which are described in detail in German Printed Applications Nos. 1,130,169, 1,131,411 and 1,300,239 it is possible to prepare such copolymers. The polymerization is carried out in organic solvents with the aid of organometallic initiators, either a polar solvent being added or the more rapidly polymerizing diene being metered in at a rate which is less than the rate of polymerization. Substantially gel-free uncrosslinked copolymers are thus formed. They should preferably contain from 10 to 60% by weight of styrene.

3. Graft copolymers of a vinylaromatic monomer onto a metallized diene polymer. In this case a polydiene is first prepared by anionic solution polymerization, for example by polymerization of butadiene in hydrocarbon solution with an alkyl lithium. This polydiene is then metallized by reaction with an alkali metal organyl. A vinyl aromatic is then grafted onto this metallized basic skeleton in hydrocarbon solution, the grafting ratio of diene polymer to styrene preferably being from 40:60 to 90:10. The graft copolymer is particularly advantageously prepared in one operation: butadiene is dissolved in a hydrocarbon, polymerized with an alkyl lithium initiator, metallized by adding a metallization complex such alkyl lithium/alkali metal alcoholate and then grafted with styrene. The graft copolymer obtained consists of a linear poly-1,3-diene skeleton having a very narrow molecular weight distribution onto which polystyrene side chains are grafted at relatively regular intervals.

Instead of diene polymers, other elastomeric polymers may be metallized in solution in a hydrocarbon and grafted with styrene; examples are terpolymers of ethylene, propylene and a diene.

The copolymers of vinylaromatics and diene hydrocarbons may also be used in hydrogenated form. The hydrogenation of the double bonds stemming from the diene hydrocarbon may be complete; however it may also be so carried out that only some of the double bonds are hydrogenated. Hydrogenation is carried out catalytically, for example according to the method described in German Printed Application No. 1,215,372. Some or all of the double bonds which are sensitive to oxidation are removed by the hydrogenation. Blended products prepared therewith therefore have greater resistance to ageing. Moreover, they have an extremely high gloss.

The three components of the mixture may be mixed together in one operation; the two soft components (B1) and (B2) may also be mixed with a small amount of the rigid component (A) as a batch. In this case it is preferable to use less than 40% by weight of the total amount of (A). This batch may then be incorporated in any amount into the main portion of the rigid component (A) depending on the degree of softness desired.

Lubricants, stabilizers and other additives, for example mineral oil, butyl starate and the like, may be added during the incorporation. Examples of stabilizers are phenolic anitoxidants or ultraviolet stabilizers.

Particularly good mixing is achieved when during incorporation the block copolymer (B2) is used in the form of a solution, for example in a hydrocarbon, the solvent being removed from the polymer melt in a downstream degassing zone. Screw extruders, for example twinscrew extruders are suitable for mixing the components; however, kneaders provided with reciprocating blades (Ko-kneader) may also used. The processing temperature is usually from 150° to 250° C. The main aim of mixing is to achieve a good and uniform distribution of the soft components in the polystyrene. The mixing equipment should therefore be so designed that it produces particle sizes of less than 100 microns, preferably of from 1 to 10 microns, for the soft component (B).

A particular embodiment of the invention consists in wholly or partly crosslinking the mixture. The crosslinking may take place during or after mixing of the components. It should be borne in mind that the soft component (B2) must be present in a substantially uncrosslinked condition at the beginning of the mixing process. A concentrate of the soft component in a portion of the rigid component may be crosslinked and only then incorporated into the main portion of the rigid component. The crosslinking itself may be carried out in different ways, for example by adding peroxides, by exposure to high-energy radiation or by strong mechanical shearing forces in the presence of atmospheric oxygen. Metal salts of organic fatty acids, for example zinc propionate, also appear to cause crosslinking.

Crosslinking by adding from 0.01 to 2% by weight (with reference to the mixture) of peroxides during the mixing of the components is particularly advantageous. The peroxides are advantageously so chosen that they are for the most part decomposed during mixing in the course of the usual residence time of a few minutes at the processing temperature. Peroxides which decompose at too low a temperature should not be used however because otherwise the soft component will be crosslinked before it is incorporated into the polystyrene, which may result in speck formation. It is preferred to use ditertiary-butyl peroxide, dicumyl (?) peroxide, tertiary-butyl hydroperoxide, methyl ethyl ketone peroxide, p-methane hydroperoxide as the peroxide. Crosslinking probably takes place both within the individual soft components and between the soft components; an additional grafting of the polystyrene onto the soft component cannot be excluded.

Crosslinking may also be effected by exposure to high-energy radiation, for example X-rays, X-rays, electron beams or neutron beams. A detailed description is to be found in volume IV of the plastics handbook "Polyolefine" by Vieweg, Schley and Schwarz, Carl-HanserVerlag, 1969, pages 169 to 176.

Crosslinking is preferably carried out with $\beta$-rays, a van de Graaff generator being used as the radiation source. The usual dosage is less then 100, preferably from 2 to 20, megarads. In this case mainly the polyolefin and polydiene components of the soft component are crosslinked. A much higher dosage is necessary to crosslink polyvinylaromatics.

The molding material is distinguished, as compared with conventional impact-resistant polystyrene prepared by blending polystyrene with rubber by improved impact strength for the same rubber content. Since an increase in the rubber content is always attended by a decrease in the rigidity, molding material according to the invention having the same impact strength as conventional impact-resistant polystyrene has much better rigidity. The molding material has higher rigidity and a better gloss than impact-resistant polystyrene which has been prepared by graft polymerization of styrene in the presence of a rubber. Moreover, the blending methods according to the invention are much simpler to carry out than graft polymerizations.

Molding materials of mixtures which have been crosslinked exhibit better impact strength and increase gloss as compared with uncrosslinked mixtures, and moreover they have a particularly favorable ratio of toughness to rigidity.

The molding materials may be used for applications for which impact-resistant polystyrene is usually employed, for example for the production of molded parts for automobiles refrigerators, domestic appliances, office machines and toys.

The following Examples illustrate the invention. The parts and percentages specified in the Examples are by weight.

Impact strength is measured at 20° C according to DIN 53,453 on small standard test specimens (injection molding temperature 240° C); tensile strength, tear resistance, and elongation are measured according to DIN 53,455 on dumbbell specimens (injection molding temperature 240° C).

EXAMPLE 1

Polystyrene in the form of granules having a viscosity number of 95 is mixed carefully with polyethylene in the form of granules having a density of 0.918 and a melt index (M.I. 190/2 - ASTM D 1238) of 1.5 and a styrene-butadiene block copolymer of the type X-Y-X (with 30% of styrene and a mean molecular weight of the polystyrene block X of 4000 to 115,000 and of the polybutadiene block Y of from 20,000 to 450,000) with an addition of 3% of a mineral oil acting as lubricant and 0.2% of a phenolic antioxidant, compounded in a twinscrew extruder at about 200° C and then granulated.

Table 1 gives the various blend ratios and the values for the molding materials. In the Table:
B = blend; TS = tensile strength; TR = tear resistance; E = elongation; and IS = impact strength.

Table 1

| B | (A): | (B1) | :(B2) | TS | TR | E | IS |
|---|---|---|---|---|---|---|---|
| a | 95: | 2.5 | :2.5 | 320 | 260 | 25 | 30 |
| b | 90: | 5 | : 5 | 280 | 200 | 30 | 42 |
| c | 80: | 10 | : 10 | 300 | 180 | 36 | 49 |

EXAMPLE 2 (Comparative experiment)

The experiment is carried out analogously to Example 1 but the polyethylene component is omitted and 5 and 10 parts of the block copolymer are used. The values obtained are given in Table 2. The products have a matt surface.

EXAMPLE 3 (Comparative experiment)

The experiment is carried out analogously to Example 1 but the block copolymer is omitted and 5 and 10 parts of polyethylene is used. The results are given in Table 2.

EXAMPLE 4

This experiment is carried out with the same batch as in Example 1b but the block copolymer is introduced in the form of 30% solution in ethylenbenzene by means of a metering pump into the melt of the other components present in an extruder. The solvent vapor is withdrawn in the degassing zone of the extruder, the material is compounded and granulated in the usual way. The results are given in Table 2.

EXAMPLE 5

The experiment in Example 4 is repeated but 0.1% of ditertiarybutyl peroxide is added to the polymer melt to effect crosslinking. The values for the product are set out in Table 2. It will be seen that the impact strength is improved; in the test only 80% of the small standard specimens are broken, whereas 100% are broken in Example 4. Moreover the product has a higher gloss.

EXAMPLE 6

The experiment of Example 4 is repeated but the product is crosslinked after blending by exposure to β-rays, the dosage being from 5 to 7 megarads (radiation source: a van de Graaff generator). The results are given in Table 2.

Table 2

| Example | (A):(B1):(B2) | TS | TR | E | IS |
|---|---|---|---|---|---|
| 1b | 90: 5 : 5 | 280 | 200 | 30 | 42 |
| 2a | 95: - : 5 | 330 | 290 | 27 | 21 |
| 2b | 90: - : 10 | 270 | 220 | 33 | 32 |
| 3a | 95: 5 : - | 275 | 180 | 16 | 6 |
| 3b | 90: 10: - | 260 | 180 | 12 | 5 |
| 4 | 90: 5 : 5 | 260 | 190 | 34 | 49 |
| 5 | 90: 5 : 5 | 280 | 190 | 36 | 59 |
| 6 | 90: 5 : 5 | 280 | 190 | 36 | 59 |

EXAMPLE 7

20 parts of a polystyrene having a viscosity number of 95 is mixed with 5 parts of a polyethylene having a density of 0.918 and 5 parts of a block copolymer of styrene and butadiene of the type X-Y (with 50% of styrene) with an addition of 3 parts of lubricant and 0.2 part of antioxidant in an extruder at about 200° C and granulated.

30 parts of this mixture (batch) is then incorporated into 70 parts of polystyrene in an extruder at 200° C. Table 3 gives the values for the product.

EXAMPLE 7a

The procedure of Example 7 is repeated except that there is used a butadiene-styrene block copolymer of the type X-Y with 50% of styrene in which the double bonds stemming from the butadiene have been selectively hydrogenated.

EXAMPLE 8

In this experiment, the batch of Example 7 is crosslinked by exposure to β-rays (dosage 7 megarads) and only then mixed with the bulk of the polystyrene.

EXAMPLE 8a

In this experiment the batch of Example 7a is crosslinked by exposure to β-rays (dosage 7 megarads) and only then mixed with the bulk of the polystyrene.

EXAMPLE 9

In this experiment the final blend of Example 7 is crosslinked by irradiation.

EXAMPLE 10

The experiment is carried out analogously to Example 7 but instead of the two-block copolymer a graft copolymer is used which has been prepared by polymerization of a solution of 50 parts of a metallized polybutadiene (molecular weight about 200,000; and average of six lithium atoms per molecule) in 50 parts of styrene. The values for the product are given in Table 3.

EXAMPLE 11

The experiment is carried out analogously to Example 7 but the soft component (B2) here is a copolymer of 25 parts of styrene and 75 parts of butadiene in statistical distribution. This copolymer is prepared by polymerization of a solution of butadiene and styrene in hexane by means of butyl lithium as catalyst at a temperature of about 100° C, only some of the more rapidly polymerizing butadiene being present at the beginning and the remainder of the butadiene being added in the course of the polymerization.

Table 3

| Example | TS | TR | E | IS |
|---|---|---|---|---|
| 7 | 290 | 190 | 15 | 18 |
| 7a | 300 | 225 | 21 | 25 |
| 8 | 360 | 230 | 33 | 39 |
| 8a | 380 | 270 | 35 | 42 |
| 9 | 330 | 210 | 21 | 29 |
| 10 | 200 | 195 | 19 | 17 |
| 11 | 250 | 160 | 34 | 30 |

EXAMPLE 12

89 parts of polystyrene, 3 parts of polyethylene and 8 parts of a block copolymer of styrene and butadiene of the type X-Y-X (styrene content 25%, gel content less than 1%) are introduced with an addition of 3% of lubricant and 0.2% of antioxidant into an extruder at 200° C, compounded and granulated. The values for the product are set out in Table 4.

EXAMPLE 13 (Comparative experiment)

An impact-resistant polystyrene is prepared by blending 89 parts of polystyrene with 8 parts of an emulsion copolymer of 23% of styrene and 77% of butadiene. 97 parts of this impact-resistant polystyrene is mixed with 3 parts of polyethylene with an addition of lubricant and antioxidant under the conditions described in Example 12. The values for the product are set out in Table 4.

EXAMPLE 14 (Comparative experiment)

Impact-resistant polystyrene is prepared by polymerization of a solution of 8 parts of polybutadiene in 89 parts of styrene and 6 parts of ethylbenzene.

97 parts of this impact-resistant polystyrene is mixed with 3 parts of polyethylene with an addition of lubricant and antioxidant under the same conditions as in Example 12. The results are set out in Table 4. Although the product has a high impact strength, it has a surface which is considerably more matt than that of the product of Example 12.

Table 4

| Example | TS | TR | E | IS |
|---|---|---|---|---|
| 12 | 560 | 470 | 31 | 40 |
| 13 | 330 | 230 | 27 | 19 |
| 14 | 490 | 430 | 13 | 52 |

EXAMPLE 15

90 parts of polystyrene is blended with 5 parts of a three-block (styrene-butadiene-styrene) copolymer (see Example 1) and 5 parts of a terpolymer of ethylene, propylene and dicyclopentadiene which contains about 75% of ethylene and 1.3% of double bonds.

The mixture is irradiated at a dosage of megarads. The product has an impact strength of 65, a tensile strength of 270, a tear resistance of 185 and an elongation of 20.

We claim:
1. An impact-resistant thermoplastic molding material for forming rigid products containing a mixture of:
   A. from 70 to 99% by weight of a high molecular weight homopolymer of styrene or of a high molecular weight copolymer of styrene with up to 60% by weight of a styrene derivative bearing a substituent on the nucleus or a side chain; and
   B. from 30 to 1% by weight of a soft component consisting essentially of a mixture of:
      1. an α-olefin polymer and
      2. a substantially gel-free uncrosslinked block copolymer of 15 to 60% by weight of a vinyl aromatic and 85 to 40% by weight of a diene hydrocarbon which has been prepared by anionic solution polymerization,
   the relative weight ratio of (1) to (2) being from 15:1 to 1:3.
2. A molding material as claimed in claim 1 wherein component (A) is polystyrene.
3. A molding material as claimed in claim 1 wherein component (B1) is a homopolymer of an olefin having 2 to 4 carbon atoms.
4. A molding material as claimed in claim 1 wherein component (B1) is a high pressure polyethylene having a molecular weight of from 10,000 to 50,000.
5. A molding material as claimed in claim 1 wherein component (B1) is a low pressure polyethylene having a molecular weight of from 40,000 to 1,000,000.
6. A molding material as claimed in claim 1 wherein the component (B2) is a block copolymer of the type X-Y or X-Y-Y in which X denotes styrene and Y denotes butadiene, and the styrene content is from 15 to 60% by weight.
7. A molding material as claimed in claim 1 wherein the double bonds of component (B2) stemming from the diene hydrocarbon are completely hydrogenated.
8. A molding material as set forth in claim 1 wherein component (A) is polystyrene and component (B2) is a styrene-butadient block copolymer of the type X-Y-X.

* * * * *